(12) United States Patent
Kamp et al.

(10) Patent No.: US 8,869,828 B2
(45) Date of Patent: Oct. 28, 2014

(54) CHECK VALVE WITH SELF-TRAPPING INSERT

(71) Applicant: Hamilton Sundstrand Corporation, Windsor Locks, CT (US)

(72) Inventors: Josh Kamp, Glastonbury, CT (US); Blair A. Smith, South Windsor, CT (US); Marc E. Gage, Feeding Hills, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/746,024

(22) Filed: Jan. 21, 2013

(65) Prior Publication Data

US 2014/0202562 A1    Jul. 24, 2014

(51) Int. Cl.
*F16K 15/03* (2006.01)
(52) U.S. Cl.
CPC .................................. *F16K 15/038* (2013.01)
USPC ........................... 137/512.1; 137/527; 251/64
(58) Field of Classification Search
CPC .. F16K 15/038; F16K 17/044; F16K 17/0493
USPC ............................ 137/512.1, 527, 904; 251/64
See application file for complete search history.

(56) References Cited

U.S. PATENT DOCUMENTS

| | | | |
|---|---|---|---|
| 2,358,101 A * | 9/1944 | Randall | 137/70 |
| 2,877,792 A * | 3/1959 | Tybus | 137/512.1 |
| 4,373,544 A | 2/1983 | Goodman et al. | |
| 5,246,032 A | 9/1993 | Muddiman | |
| 5,784,894 A | 7/1998 | Army, Jr. et al. | |
| 5,836,349 A | 11/1998 | Kimberly et al. | |
| 5,924,445 A | 7/1999 | Ambrose et al. | |
| 6,851,255 B2 | 2/2005 | Aitchison et al. | |
| 7,114,519 B2 | 10/2006 | Aitchison et al. | |
| 7,422,029 B2 | 9/2008 | Denike et al. | |
| 7,493,770 B2 | 2/2009 | Christianson et al. | |
| 7,568,498 B2 | 8/2009 | Denike et al. | |
| 7,779,859 B2 | 8/2010 | Denike et al. | |
| 8,181,669 B2 | 5/2012 | Dehais et al. | |
| 8,201,576 B2 | 6/2012 | Klein | |
| 2008/0053536 A1 | 3/2008 | Denike et al. | |
| 2008/0072973 A1 | 3/2008 | McGonigle et al. | |
| 2008/0078458 A1 | 4/2008 | Denike et al. | |
| 2008/0078459 A1 | 4/2008 | Warriner et al. | |
| 2009/0071549 A1 | 3/2009 | Denike et al. | |
| 2010/0282340 A1 | 11/2010 | Dehais et al. | |
| 2013/0340862 A1 | 12/2013 | Kamp et al. | |

FOREIGN PATENT DOCUMENTS

EP        2249068 A2    11/2010

OTHER PUBLICATIONS

GB Search and Examination Report issued in GB Application No. 1400995.5 on Feb. 9, 2014, 5 pages.

* cited by examiner

*Primary Examiner* — Kevin Lee
*Assistant Examiner* — P. Macade Nichols
(74) *Attorney, Agent, or Firm* — Cantor Colburn LLP (57) ABSTRACT

A check valve is provided and includes a body including a seat, a hinge bifurcating the seat to define openings and a housing coupled to the hinge and a self-trapping insert of compliant material. The self-trapping insert includes an end portion and is securable in the housing such that the end portion protrudes from a side of the housing to contact with a corresponding check valve flapper in a respective open position.

16 Claims, 8 Drawing Sheets

FIG. 8

CHECK VALVE WITH SELF-TRAPPING INSERT

BACKGROUND OF THE INVENTION

The subject matter disclosed herein relates to a check valve and, more particularly, to a check valve with a self-trapping insert.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes flappers that occupy closed positions when the high pressure stage bleed air has a higher pressure than the low pressure stage compressor whereby the high pressure stage bleed air is prevented from backflowing into the low stage compressor. These flappers open when the pressure of the low pressure stage compressor exceeds that of the high stage bleed air.

When the flappers open, they often pivot at a relatively high angular velocity and impact the housing of the check valve, which is normally provided with a linear compliant stop. Opposite sides of the linear compliant stop form linear contact areas with each of the flappers that are each limited in size and their respective ability to absorb the impacts. Structurally withstanding the high opening velocities and the impacts between the compliant stop and the flappers has, thus, proven to be challenging.

BRIEF DESCRIPTION OF THE INVENTION

According to one aspect of the invention, a check valve is provided and includes a body including a seat, a hinge bifurcating the seat to define openings and a housing coupled to the hinge and a self-trapping insert of compliant material. The self-trapping insert includes an end portion and is securable in the housing such that the end portion protrudes from a side of the housing to contact with a corresponding check valve flapper in a respective open position.

According to another aspect of the invention, a check valve is provided and includes a body including a seat, a hinge bifurcating the seat to define openings and a housing coupled to the hinge and inserts of compliant material. Each insert includes an end portion and is securable in the housing such that the end portion protrudes from a side of the housing to contact with a corresponding check valve flapper in a respective open position.

According to yet another aspect of the invention, a check valve is provided and includes a body including a seat, a hinge bifurcating the seat to define openings and a housing coupled to the hinge, flappers pivotably coupled to the hinge to pivot in response to a pressure differential across the seat from respective closed positions at which the first and second flappers prevent fluid flow through the openings to respective open positions at which fluid flow through the openings is permitted and inserts of compliant material. Each insert includes an end portion and is securable in the housing such that the end portion protrudes from a side of the housing to contact with a corresponding one of the flappers in the respective open position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and has self-trapping inserts to dampen and withstand high opening and closing velocities of the check valve flappers.

Figure 1:
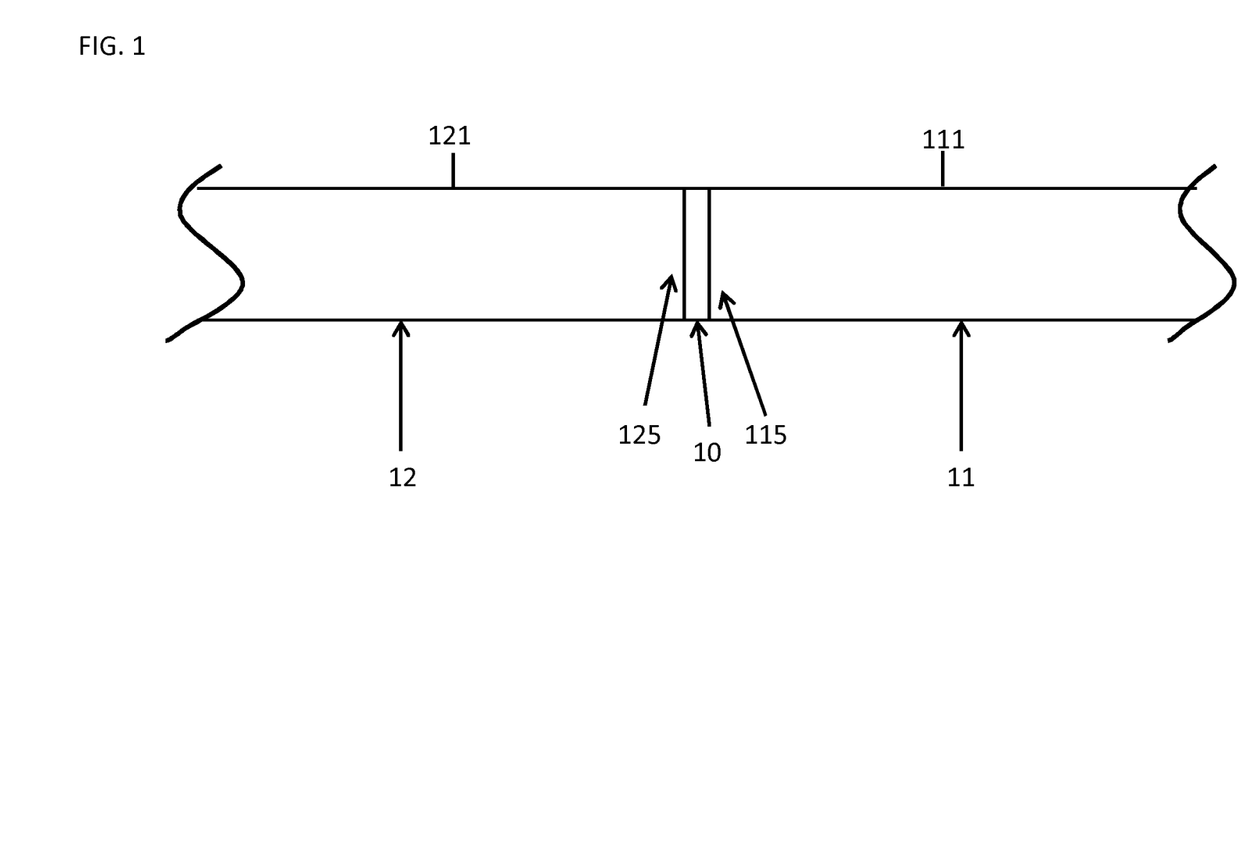
FIG. 1 is a schematic view of a check valve interposed between single ducts.
Figure 2:
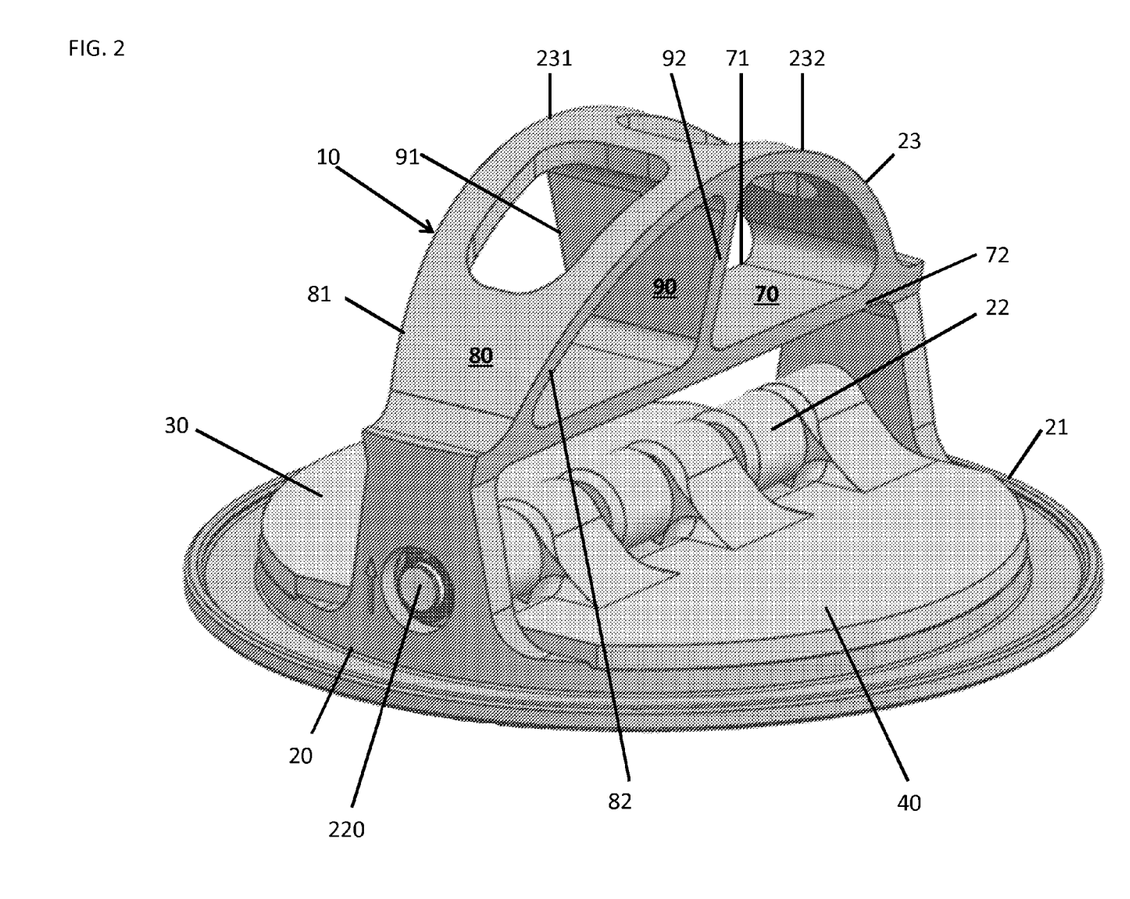
FIG. 2 is a perspective view of a check valve with flappers in respective closed positions.
Figure 3:
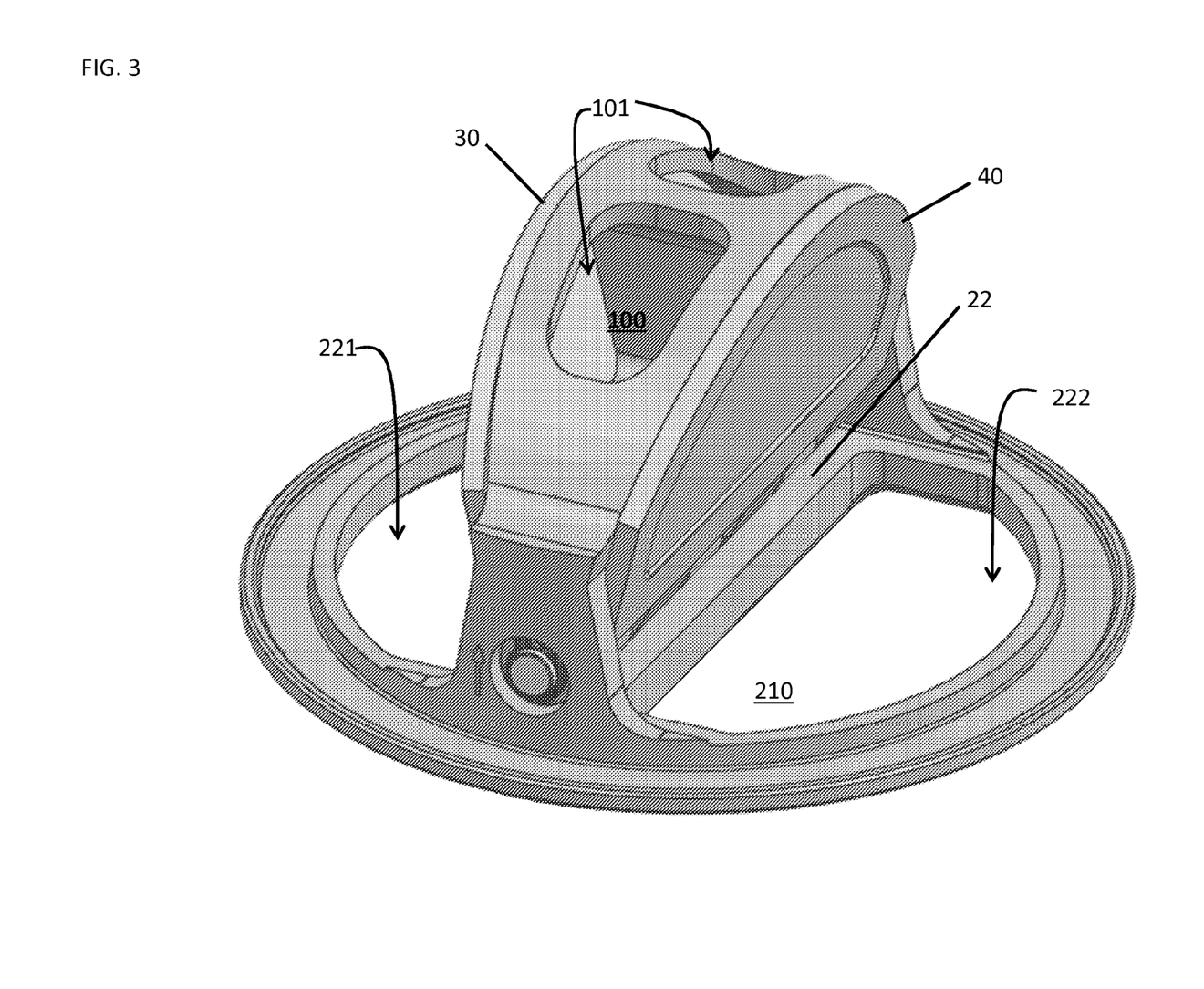
FIG. 3 is a perspective view of the check valve of FIG. 2 with the flappers in respective open positions.

With reference to FIGS. 1-3, a check valve 10 is provided. The check valve 10 is interposed between upstream ductwork 11 and downstream ductwork 12. As shown in FIG. 1, the upstream ductwork 11 is formed of a single duct 111 and the downstream ductwork 12 is similarly formed of a single duct 121. This configuration is, of course, exemplary, and it is to be understood that alternate configurations are possible and will be described below with reference to FIG. 5.

As shown in FIG. 2, the check valve 10 includes a check valve body 20 and first and second flappers 30 and 40. The check valve body 20 includes a seat 21, a hinge 22 and a housing 23. The seat 21 is annularly shaped and is formed to define an aperture 210 (see FIG. 3) that extends axially from an upstream end of the seat 21, which is associated with the upstream ductwork 11, to a downstream end of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end 115 (see FIG. 1) of the upstream ductwork 11 and a complementary forward end 125 (see FIG. 1) of the downstream ductwork 12. The hinge 22 may be provided as a pin-hinge with a central pivot axis defined along a pin 220 and is disposed to bifurcate the aperture 210 defined by the seat 21 to thereby further define a first opening 221 (FIG. 3) on one side of the hinge 22 and a second opening 222 (FIG. 3) on the other side of the hinge 22. The housing 23 is coupled to opposite ends of the hinge 22.

The first and second flappers 30 and 40 are pivotably coupled to the hinge 22 to pivot about the central pivot axis in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second flappers 30 and 40 are configured to pivot from respective closed positions at which the first and second flappers 30 and 40 prevent fluid flow through the first opening 221 and the second opening 222 to respective open positions at which fluid flow through the first opening 221 and the second opening 222 is permitted.

The housing 23 of the check valve body 20 has first and second opposite sides 231 and 232. The first side 231 is associated with the first opening 221 and the first flapper 30 while the second side 232 is associated with the second opening 222 and the second flapper 40. When the first and second flappers 30 and 40 are disposed in the respective closed positions, the first and second flappers 30 and 40 are displaced from the first and second sides 231 and 232. When the first and second flappers 30 and 40 pivot to the respective open positions, the first and second flappers 30 and 40 impact and make contact with the first and second sides 231 and 232, respectively. In such cases, with reference to FIG. 4, the first and second sides 231 and 232 form linear contact surfaces 50 with each of the first and second flappers 30 and 40, respectively, and additional contact surfaces 60 with each of the first and second flappers 30 and 40, respectively.

In accordance with embodiments, a pressure differential between the upstream ductwork 11 and the downstream ductwork 12 may be about 20 psi or more. At such pressures, the first and second flappers 30 and 40 may be disposed to pivot toward the respective open positions at an angular speed of about 150 radians per second or more.

Figure 4:
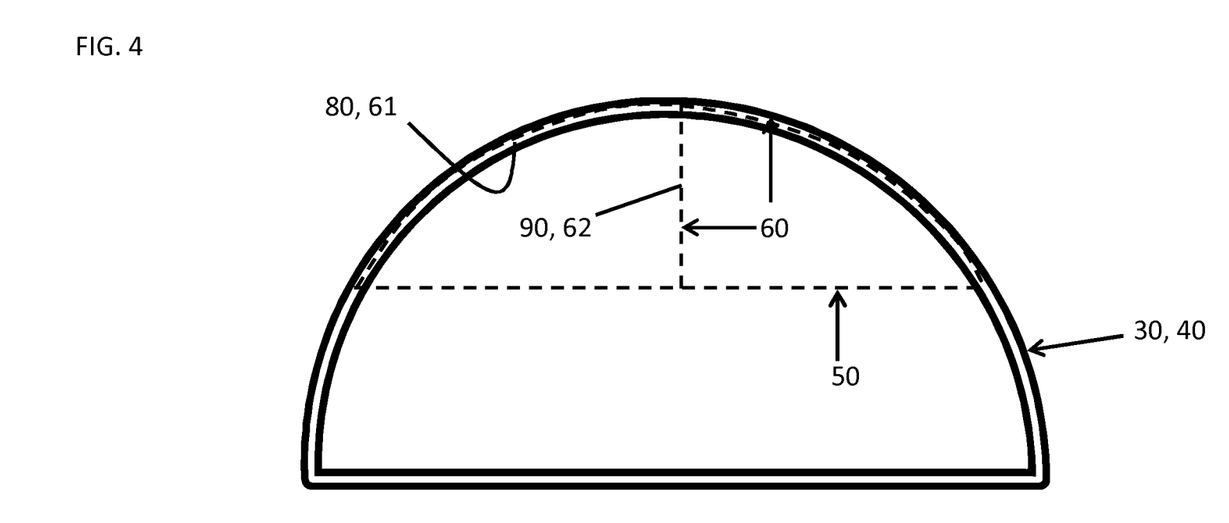
FIG. 4 is a side view of the linear and additional contact surfaces of the check valve of FIGS. 2 and 3.

As shown in FIG. 4, the additional contact surfaces 60 may include one or more arcuate surfaces 61, one or more linear surfaces 62 or a combination of one or more arcuate surfaces 61 and one or more linear surfaces 62. The configuration of the one or more linear contact surfaces 50 and the one or more additional contact surfaces 60 is defined by the overall structural components of the housing 23 of the check valve body 20. That is, as shown in FIGS. 2 and 3, the housing 23 includes a base 70 as well as at least one or both of an additional structural member 80 that may be arcuate in shape (i.e., an arcuate segment) and an additional structural member 90 that may be substantially linear in shape (i.e., a linear rib).

The base 70 may be but is not required to be substantially linear and has opposite sides 71 and 72. Where the base 70 is linear, the opposite sides are configured to form the linear contact surfaces 50 with each of the first and second flappers 30 and 40, respectively. Similarly, the additional, arcuate structural member 80 and the additional, linear structural member 90 each have opposite sides 81 and 82 and 91 and 92 that are configured to form the additional arcuate and linear contact surfaces 60 with each of the first and second flappers 30 and 40, respectively.

For the exemplary embodiment of FIGS. 2 and 3, the housing 23 has an "orange slice" configuration. That is, the base 70 is substantially flat and linear and the additional, arcuate structural member 80 arcs above the base 70. The additional, linear structural member 90 extends from the base 70 to the additional, arcuate structural member 80 to define spaces 100 (see FIG. 3) within the housing 23. Apertures 101 defined in the additional, arcuate structural member 80 (see FIG. 3) allow fluid flow into the spaces 100. Where the pressure of the fluid in the spaces 100 exceeds the pressure within the downstream ductwork 12, the pressure causes the first and second flappers 30 and 40 to pivot toward the respective closed positions.

Figure 5:
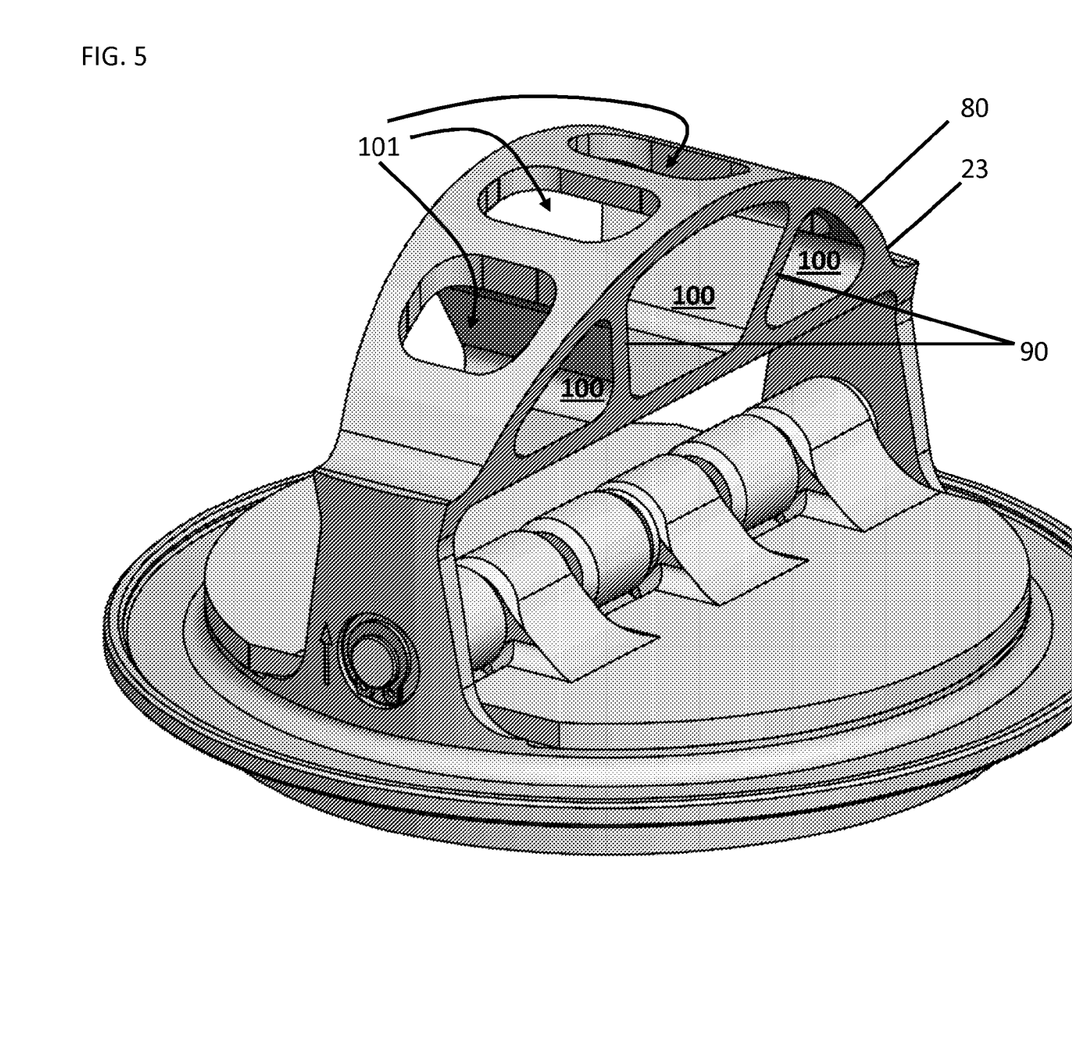
FIG. 5 is a perspective view of a check valve with flappers in respective closed positions in accordance with alternative embodiments.

In accordance with further and/or alternative embodiments and, with reference to FIG. 5, the additional, linear structural member 90 may be plural in number with additional apertures 101 defined in the additional, arcuate structural member 80. For example, two or three additional, linear structural members 90 may be provided at appropriate angles from one another to thereby define three spaces 100 within the housing 23. These three spaces 100 would each be chargeable by fluid passing through four corresponding apertures 101. In addition, the spaces 100 may also be provided with aerodynamic elements, such as airfoils and baffles, to direct fluid flow outwardly toward the first and second flappers 30 and 40.

As shown in FIG. 4, the distal ends of the first and second flappers 30 and 40 may have profile shapes that are substantially similar to the profile of the additional, arcuate structural member 80. Thus, when the first and second flappers 30 and 40 occupy the open positions, respective edges of the first and second flappers 30 and 40 may lie flush with complementary edges of the additional, arcuate structural member 80.

Figure 6:
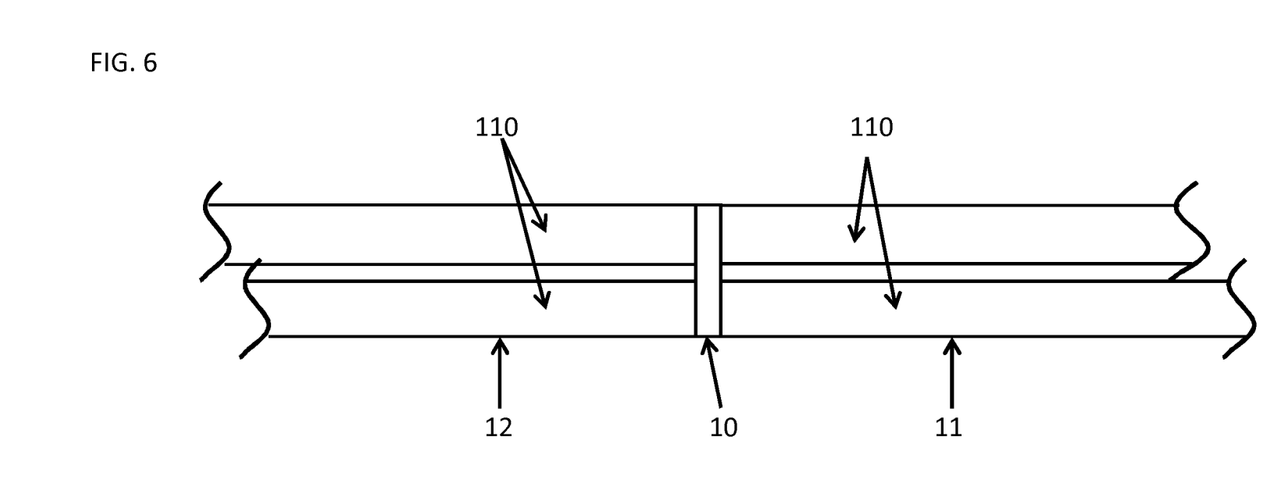
FIG. 6 is a schematic view of a check valve interposed between multiple ducts.

With reference to FIG. 6, at least one of the upstream ductwork 11 and the downstream ductwork 12 includes multiple ducts 110. For example, as shown in FIG. 6, both the upstream and the downstream ductwork 11 and 12 may include two ducts 110 each whereby corresponding ducts 110 in the upstream and downstream ductwork 11 and 12 communicate with one another by way of the first and second openings 221 and 222, respectively. In such cases, the first and second flappers 30 and 40 need not open and close together but it may be necessary to further bifurcate the spaces 100 within the housing 23 along a longitudinal axis of the hinge 22. Although illustrated as having a 1:1 ratio, it is to be understood that the upstream ductwork 11 and the downstream ductwork 12 need not have the same number of multiple ducts 110. That is, the two ducts 110 of the upstream ductwork 11 could lead to a single duct 110 in the downstream ductwork 12, for example.

Figure 7:
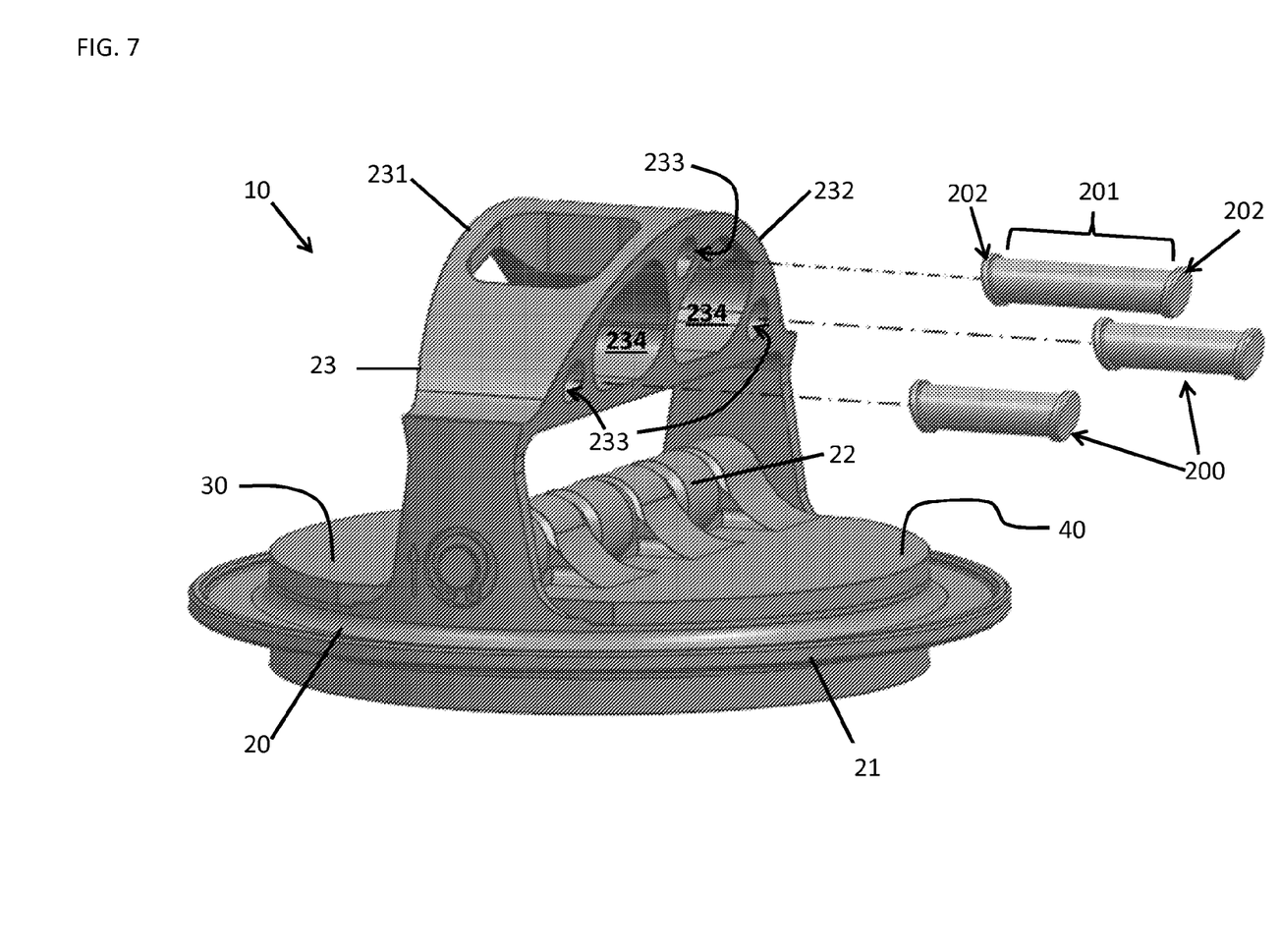
FIG. 7 is a perspective exploded view of a check valve with self-trapping inserts in accordance with further embodiments.

With reference to FIG. 7, the check valve 10 as described above includes a check valve body 20 and first and second flappers 30 and 40. The check valve body 20 includes a seat 21, a hinge 22 and a housing 23, which has first side 231 and second side 232 that diverge from one another at a predefined angle. The housing 23 is formed to define through-holes 233, which extend from the first side 231 to the second side 232, and cavities 234 between the through-holes 233. The cavities 234 are similar to the spaces 100 described above.

As shown in FIG. 7, at least one or more self-trapping inserts 200 are provided. For purposes of clarity and brevity, an embodiment of three uniformly separated self-trapping inserts 200 will be described although it is to be understood that only one, two or more than three self-trapping inserts 200 may be employed. The self-trapping inserts 200 are each formed of compliant material, such as elastomeric material (e.g., Kalrez™). Each self-trapping insert 200 includes a central portion 201 having opposite distal ends and a pair of end portions 202 that are disposed at the distal ends of the central portion 201 and diverge from one another at the predefined angle. A width or diameter of the central portion 201 is substantially similar to the width or diameter of a corresponding one of the through-holes 233 whereas respective widths or diameters of each of the end portions 202 are greater than the widths of the central portion 201 and the corresponding one of the through-holes 233.

Each of the three self-trapping inserts 200 is thus respectively receivable into a corresponding one of the through-holes 233 of the housing 23. The central portions 201 each have a length that is substantially similar to a local width of the housing 23 such that the end portions 202 protrude from the first and second sides 231 and 232 while abutting and overhanging a lip of the housing 23 at the through-hole 233 in order to secure the self-trapping inserts 200 in place. In this way, when one of the first and second flappers 30 and 40 move to the respective open positions, they impact and come into contact with the self-trapping inserts 200 but not the housing 23.

The self-trapping inserts 200 are generally formed to dampen the impacts with the first and second flappers 30 and 40. Thus, the compliant or elastomeric material of the self-trapping inserts 200 should not be rigid but should not buckle under loading or provide a spring-like effect to the first and second flappers 30 and 40.

Figure 8:
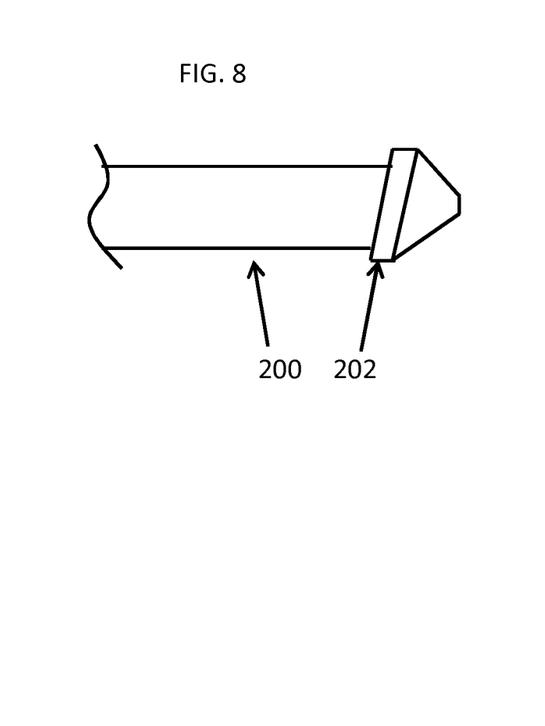
FIG. 8 is a partial side view of a self-trapping insert in accordance with alternative embodiments.
Figure 9:
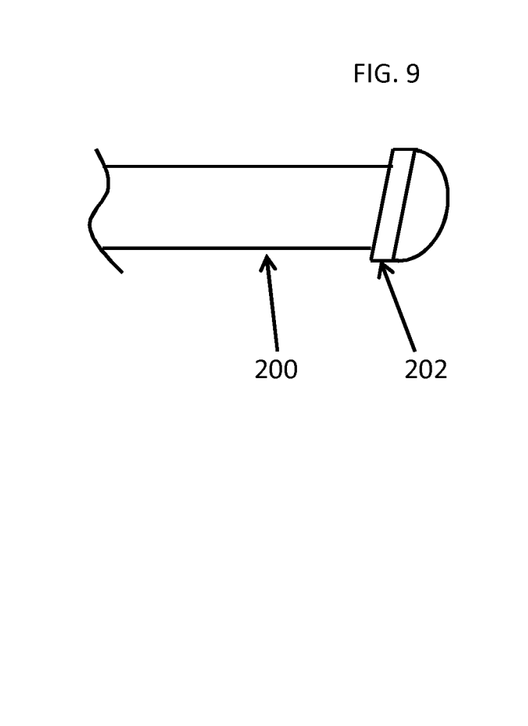
FIG. 9 is a partial side view of a self-trapping insert in accordance with alternative embodiments.

As shown in FIG. 7, the end portions 202 of the self-trapping inserts 200 may be substantially flat or pad shaped with a slight central bulge. However, it is to be understood that this is merely exemplary and that other embodiments are possible. For example, with reference to FIGS. 8 and 9, the end portions 202 of the self-trapping inserts 200 may include a crayon-type shape with a taper leading toward an outermost point (see FIG. 8) or a hemispherical shape (see FIG. 9).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve, comprising:
 a body including a seat, a hinge bifurcating the seat to define openings and a housing coupled to the hinge and including opposite sides; and
 a self-trapping insert of compliant material, the self-trapping insert including an end portion having a taper and being securable in the housing such that the end portion protrudes from a side of the housing with the taper formed such that the end portion aligns with the side of the housing to contact with a corresponding check valve flapper in a respective open position.

2. The check valve according to claim 1, wherein the self-trapping insert is configured to dampen an impact of the corresponding check valve flapper with the housing.

3. The check valve according to claim 1, wherein the housing is formed to define a through-hole into which the self-trapping insert is receivable, the self-trapping insert comprising:
 a central portion having distal ends and a width that is substantially similar to a width of the through-hole; and
 the end portion and an opposite end portion, which are respectively disposed at the distal ends of the central portion and which have widths that are greater than the width of the central portion and the through-hole.

4. The check valve according to claim 1, wherein the self-trapping insert comprises elastomeric material.

5. A check valve, comprising:
 a body including a seat, a hinge bifurcating the seat to define openings and a housing coupled to the hinge including opposite sides that diverge at a predefined angle; and
 inserts of compliant material, each insert including an end portion and being securable in the housing such that the end portion protrudes from a side of the housing to contact with a corresponding check valve flapper in a respective open position,
 wherein the end portion of each insert comprises a pair of end portions, each insert comprises a central portion having distal ends at which the pair of end portions are disposed and the end portions of each insert diverge at the predefined angle.

6. The check valve according to claim 5, wherein the housing is formed to define through-holes into each of which respective ones of the inserts are securably receivable.

7. The check valve according to claim 6, wherein the housing is further formed to define cavities between the through-holes.

8. The check valve according to claim 5, wherein the inserts comprise elastomeric material.

9. The check valve according to claim 5, wherein the end portions of each insert are wider than the corresponding central portion and are pad shaped, tapered or hemispherical.

10. The check valve according to claim 5, wherein the inserts are substantially uniformly separated from one another.

11. A check valve, comprising:
 a body including a seat, a hinge bifurcating the seat to define openings and a housing coupled to the hinge including opposite sides that diverge at a predefined angle;
 flappers pivotably coupled to the hinge to pivot in response to a pressure differential across the seat from respective closed positions at which the first and second flappers prevent fluid flow through the openings to respective open positions at which fluid flow through the openings is permitted; and
 inserts of compliant material, each insert including an end portion and being securable in the housing such that the end portion protrudes from a side of the housing to contact with a corresponding one of the flappers in the respective open position,
 wherein the end portion of each insert comprises a pair of end portions, each insert comprises a central portion having distal ends at which the pair of end portions are disposed and the end portions of each insert diverge at the predefined angle.

12. The check valve according to claim 11, wherein the housing is formed to define through-holes into each of which respective ones of the inserts are securably receivable.

13. The check valve according to claim 12, wherein the housing is further formed to define cavities between the through-holes.

14. The check valve according to claim 11, wherein the inserts comprise elastomeric material.

15. The check valve according to claim 11, wherein the end portions of each insert are wider than the corresponding central portion and are pad shaped, tapered or hemispherical.

16. The check valve according to claim 11, wherein the inserts are substantially uniformly separated from one another.

* * * * *